TIME MULTIPLEX COMMUNICATION SYSTEM EMPLOYING THIRD PARTY BREAK-IN APPARATUS INCLUDING SPEECH ENERGY STORES

Original Filed Sept. 3, 1963

June 23, 1970 A. FISCH ET AL 3,517,135

TIME MULTIPLEX COMMUNICATION SYSTEM EMPLOYING THIRD PARTY BREAK-IN APPARATUS INCLUDING SPEECH ENERGY STORES

Original Filed Sept. 3, 1963 7 Sheets-Sheet 2

June 23, 1970 A. FISCH ET AL 3,517,135

TIME MULTIPLEX COMMUNICATION SYSTEM EMPLOYING THIRD PARTY BREAK-IN APPARATUS INCLUDING SPEECH ENERGY STORES

Original Filed Sept. 3, 1963 7 Sheets-Sheet 6

United States Patent Office 3,517,135
Patented June 23, 1970

3,517,135
TIME MULTIPLEX COMMUNICATION SYSTEM EMPLOYING THIRD PARTY BREAK-IN APPARATUS INCLUDING SPEECH ENERGY STORES

Albert Fisch, Munich, and Otto Kneisel, Gauting, Germany, assignors to Siemens Aktiengesellschaft, Munich, Germany, a corporation of Germany Continuation of application Ser. No. 305,960, Sept. 3, 1963. This application July 30, 1968, Ser. No. 750,715
Claims priority, application Germany, Sept. 4, 1962, S 81,265
Int. Cl. H04m 3/56; H04j 3/00
U.S. Cl. 179—18 8 Claims

ABSTRACT OF THE DISCLOSURE

A time-division multiplex telecommunications system provides for the connection of a calling station via the speech multiplex line to a busy station by utilizing a special signal generated at the calling station for initiating break-in to the already established connection. Such an arrangement is also suitable for use in monitoring, etc. A free speech energy store is allotted to the breaking-in station and to the called busy station and operated during the time position assigned to each of the stations. Control signals are transmitted to a central control system which in response thereto effects the storing of the address of the free speech energy store in a memory for a speech energy store addresses at the time slot allotted to the third party calling station, and subsequently effects the transfer of the address of the free speech energy store from an address generator which is operable to provide the addresses of a plurality of speech energy stores in cyclic sequence to the memory for speech energy store addresses at the time slot of the existing connection, the speech energy store being thereby connected to the speech multiplex line at both the time slot allotted to the existing connection and to the time slot allotted to the third party calling station so that the third party calling station can communicate with the already busy called station of the existing connection.

CROSS REFERENCE TO RELATED APPLICATION

This application is a continuation of our application of the same title, Ser. No. 305,960, filed Sept. 3, 1963.

BACKGROUND OF THE INVENTION

Field of the invention

This invention relates to a time-division multiplex communications system, and more particularly to time-division multiplex telephony systems of the type in which a calling station is able to establish a connection to a busy called station through the medium of speech energy stores.

Description of the prior art

In time-division multiplex telephone systems of the type specified the time positions or time slots are generally defined as the pulse width of the repetitive output pulses of clock apparatus. Such time positions or time slots are assigned by the system either permanently to the individual stations or to each established telephone connection for the duration thereof. It should be noted that throughout the present application the word "station" is employed to denote either a subscriber's station or an operator's position. Systems are known wherein subscriber stations from a number of subscriber station groups can be interconnected by way of their own group speech multiplex lines by means of speech energy stores which temporarily store the speech energy to be exchanged between the stations concerned in the telephone connection. In cases where the stations concerned are connected to the speech multiplex lines of their respective groups at different times, the speech energy stores serve to bridge the interval between the times at which speech switches of the stations to be interconnected are operated. Heretofore, however, systems of the time-division multiplex type have not provided that a calling station be able to establish a connection to a busy called station.

SUMMARY OF THE INVENTION

According to the present invention, there is provided a time-division multiplex telecommunication system wherein, in the event of a connection existing and a third station on concern therewith attempts to establish a connection to one of said two stations, signals are transmitted from the third station to a central control system which in response thereto effects the storing of the address of the free speech energy store in a memory for speech energy store addresses at the time position allotted to the third station, and subsequently effects the transfer of the address of the free speech energy store from an address generator. The address generator emits at its output the addresses of a plurality of speech energy stores in cyclic sequence to the memory for speech energy store addresses at the time position of the existing connection, the speech energy store being thereby connected to speech multiplex line during the time position of the existing connection and during the time position allotted to the third station whereby the third station can communicate with one of the two stations concerned in the existing connection.

Consequently, a station can be connected via the speech multiplex line, to a speech station found to be engaged, upon the generation and transmission from the calling station of a special signal for initiating break-in, the connection being effected by means of a speech energy store which transfers the speech energy at one time position to another time position. The calling station therefore breaks into the existing connection in which the called station is concerned. Accordingly, the arrangement according to the present invention may also be utilized for monitoring purposes.

BRIEF DESCRIPTION OF THE DRAWINGS

The invention, its organization, construction and operation will be best understood from the following description taken in conjunction with the accompanying drawings which illustrate two embodiments of the invention as particularly directed to telephone systems and, in which.

DESCRIPTION OF THE PREFERRED EMBODIMENTS

Figure 1A:
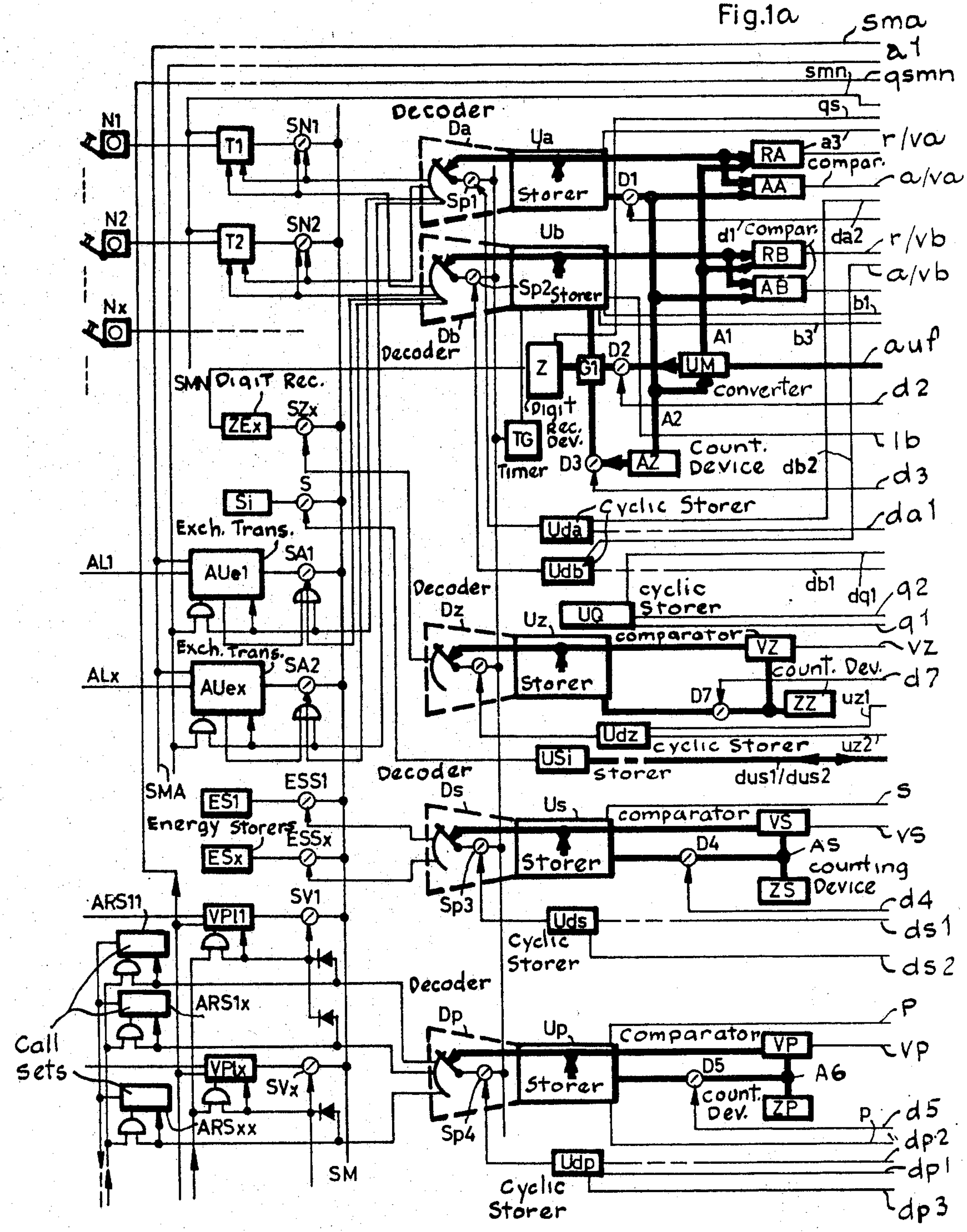
FIGS. 1*a* and 1*b* together form a schematic diagram of a time-division multiplex telephone system according to the present invention.

Inasmuch as two embodiments are to be illustrated and described, the following description is set forth in two major parts, a general description and a detailed description, and the detailed description is set forth as a plurality of portions described in accordance with the operation of the apparatus to provide a desired result.

GENERAL DESCRIPTION OF OPERATION

In the drawings, generators AZ, ZZ, and AP generate pulses controlling the sequence of corresponding information. For example, generator AZ delivers at its output A1 1,000 subscriber station addresses every 100 msec. In other words, every subscriber station address (equivalent number) is emitted from output A1 of generator AZ for 100 $\mu$sec. every 100 msec. Generator AZ can be, for instance, a ring counter which in a well known manner generates a different address at its output A1 upon each activation. The generation of an address at output A1 of generator AZ causes a converter UM, which is, for instance, a magnetic core memory of known construction, emit simultaneously to outputs A2, A3, A4 the addresses corresponding to the address generated at output A1 of generator AZ. The addresses delivered at the outputs of converter UM are, for instance, the directory numbers, class of service, etc. The converter UM therefore stores different kinds of addresses for 1,000 different subscriber stations.

Generators ZZ, ZS and ZP may be of similar construction to the generator AZ. Generator ZS generates the addresses of the speech energy stores ES1–ES$x$ at output A5. For example, if there are 10 speech energy stores, the address of the first speech energy store ES1 is effective at output A5 at 1 ms. intervals (assuming that an address is generated every 100 $\mu$sec.). Generator ZP generates the addresses of the operators' sets ARS11–ARS$xx$ at its output A6. If there are 100 such operators' sets, the same address is effective at output A6 at 10 ms. intervals. Generators ZS and ZP therefore operate at a greater frequency than does generator AZ, with a corresponding increase in frequency of operation for switching and gating operations controlled by generators ZS and ZP. Generator ZZ operates in the same way.

To control the establishment of a telephone connection and for the duration thereof, a time slot is allotted to the calling station. It will be assumed that there are 100 time positions, positions P0 and P96, P97, P98, P99 serving as control time positions and the remaining time positions P1 to P95 serving as speech time positions. Inasmuch as every address generated by generator AZ appears at the output A1 for a time of 100 $\mu$sec., a time slot of the 100 time slots can last for an interval of 1 $\mu$sec. Consequently, a station can be tested within 100 $\mu$sec. for the particular time slot assigned thereto and for the operative state (during time positions P1 to P95) present during such time positions. Whenever a station requiring to make a call goes off-hook, a particular time slot is assigned to the station to enable the operations occurring in connection with the station to be properly identified.

From the foregoing, therefore it has been shown that time slots P0 to P99 are generated during every cycle, i.e. every 100 $\mu$sec., and so, if, for instance, time slot P1 is allotted to a station, all the signals occurring with the various switching operations can be checked and processed every 100 $\mu$sec. Consequently, a speech switch, for example, SN1, is closed every 100 $\mu$sec., i.e. the associated station is connected to the speech multiplex line SM every 100 $\mu$sec. The information collecting time of 100 $\mu$sec. is called the information cycle. To process the data collected, the generator AZ is stopped for 100 $\mu$sec. This time of 100 $\mu$sec. is called the operation cycle. During the operation cycle the operations necessary for establishing the desired connection are carried out for the station indicated by the appropriate generator, in this case, generator AZ. Only after completion of the operation cycle is the generator AZ stepped on to a new address, so that another station can be tested for its operative condition.

Figure 1B:
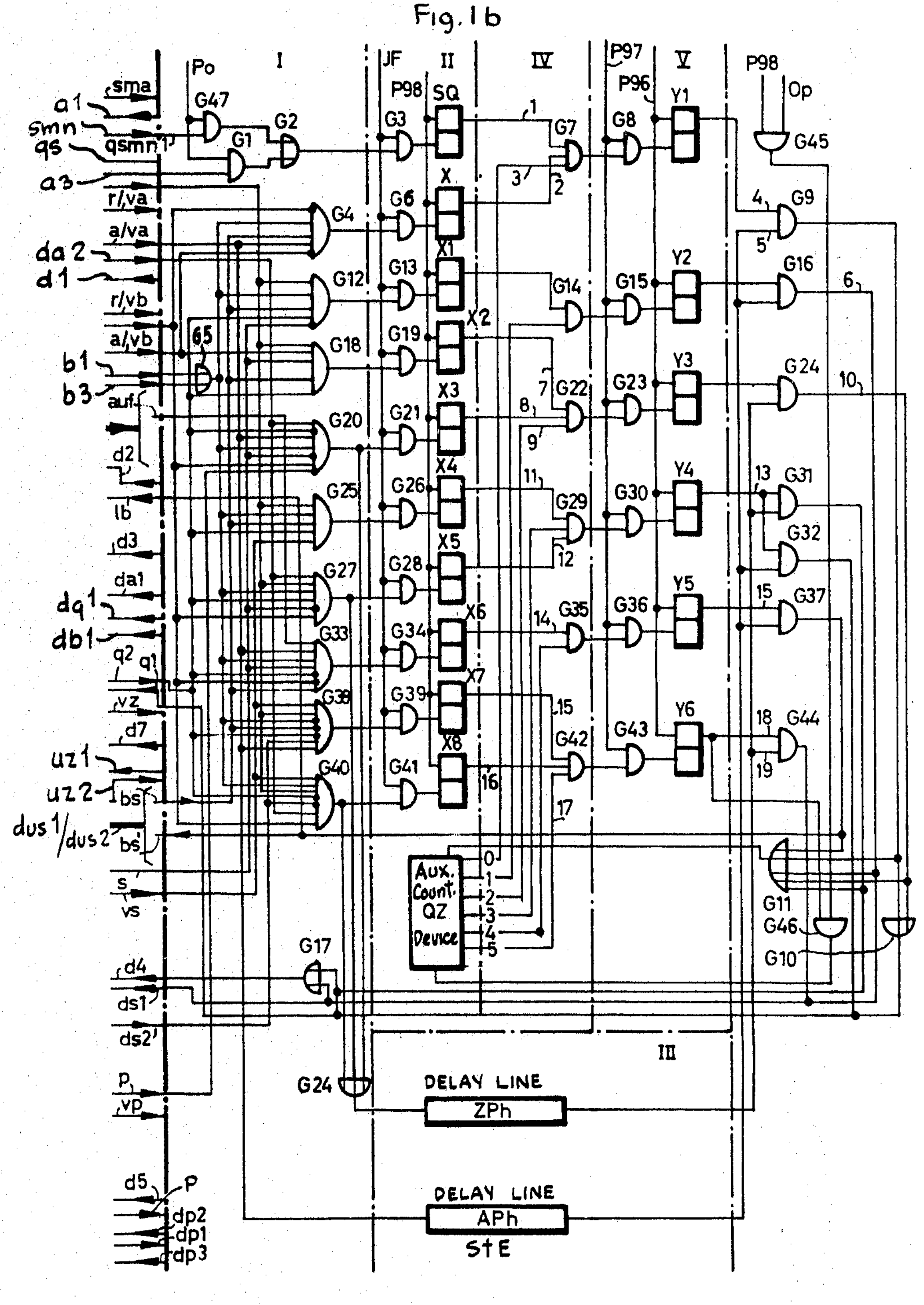

Referring specifically to FIGS. 1*a* and 1*b*, subscriber N1 to N$x$ exchange lines AL1 to AL$x$, speech energy stores ES1 to ES$x$ and operators' sets ARS11 to ARS$xx$ of operators' positions VP11 to VP1$x$ are provided. The stations N1 to N$x$ are connectable to a speech multiplex the SM via speech switches SN1 to SN$x$, the exchange line circuits AU*e*1 to AU*ex* can be connected to the multiplex line SM by way of respective switches SA1 to SA$x$, the speech energy stores ES1 to ES$x$ can be connected to the line SM by way of respective switches ESS1 to ESS$x$ and the operators' position VP11 to VP1$x$ can be connected to the line SM by way of respective switches SV1 to SV$x$. The switches are controlled by pulses through the media of rotary memories U*a*, U*b*, U*s* and U*p*.

Figure 3:
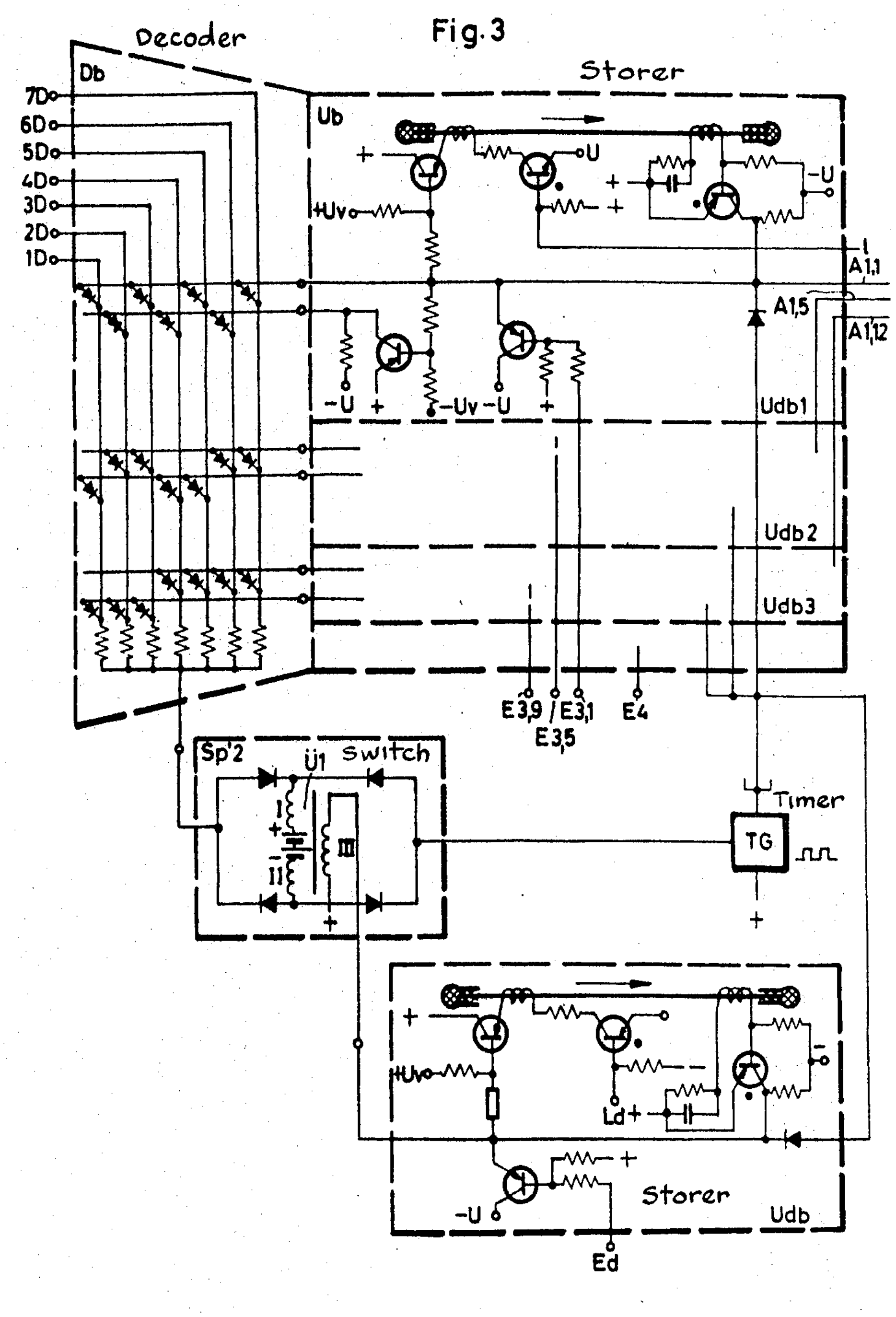
FIG. 3 is a circuit diagram of a memory and its associated apparatus which may be employed in both of the foregoing embodiments of FIGS. 1 and 2.

If the time position or time slot P1 is allotted to station N1, the speech switch SN1 is closed, by way of decoder D*a* of the 100 $\mu$sec. at the time of time position P1, by a pulse which circulates in the rotary member U*a* (see FIG. 3) during the P1 time position. Pulses of various time positions circulate in memory U*a* in encoded form. The pulses stored for a particular time position correspond to an address of a calling station or of a busy incoming exchange line or, if the exchange is calling a subscriber station, to the address of the called subscriber station. The rotary memory U*b* stores the addresses of called stations, and of busy outgoing exchange lines. Those addresses which circulate in the memories which are associated with any one connection all have the same time position and are therefore delivered simultaneously at the output of the rotary memories. A corresponding decoder D*a*, D*b*, D*s* and D*p* is connected to one output of each rotary memory U*a*–U*p*, respectively. Each such decoder is constructed as shown in FIG. 3 and has as many outputs as there are subscriber stations, speech energy stores, and operators' sets. In other words, each decoder output is assigned to either a subscriber's station, a speech energy store, or to an operators' set. Each speech switch is also connected to an output of the corresponding decoder. Or-gates are provided (not shown) to prevent interaction between the decoders. The decoders transmit pulses at predetermined time positions to appropriate speech switches of similar construction to the switches of FIG. 3, to close such switches. When two or more speech switches are closed simultaneously during any time position, there is a talking connection established between the associated devices, for instance, subscriber stations.

ESTABLISHING A TELEPHONE CONNECTION

Assuming that a telephone connection is required between calling station N1 and called station N2, the altered state of the loop due to the subscriber N1 going off-hook is determined when the generator AZ provides the address of station N1 at output A1. At a control time position, for instance P0, a pulse is transmitted via a signal multiplex line *sma* to a central system S*t*E. This pulse is used to determine first whether a free time position is available for the required connection. If a time position, for instance, time position P1 is free, such position is assigned to the calling station N1 for the duration of the connection. The directory number of station N1 is entered in the rotary memory U*a*, in an operation cycle of the central control system S*t*E which follows the information cycle. During the information cycle, all the information supplied to the central control system is stored therein. In the operation cycle which follows the information cycle, the information stored during one time position is processed, whereafter write-in pulses for initiating particular switching operations are subsequently delivered during the corresponding time position P1. In the particular case being considered, the switch D1 is closed so that the address, i.e. equipment number, generated at output A2 by generator AZ is received in the rotary member U*a*. Such address circulates therein periodically at the pulse repetition frequency of the time positions (100 $\mu$sec.) and is effective by way of decoder D*a* to control the switch SN1 during the time position P1. The calling station N1 can now deliver the address of the wanted station. The address is fed to the speech multiplex line SN via speech switch SN1 which closes during time position P1. A free digits receiver ZE$x$ is also connected to multiplex line SM during the time position P1 and receives the address, and by way of gate G1, supplies the address in a predetermined code during time position P1 to the memory U$b$. The called station address is first entered in the memory U$b$ as a directory number, and only after the call station is found to be free is its equipment number entered in memory U$b$ in place of the directory number. These various operations, which are related to testing to determine the status of the called line (free or busy), are controlled by comparators RB, AB and RA, AA and the central control system S$t$E. When the called line has been found to be free, the central control system S$t$E sends a pulse to switch D3 to cause the equipment number of the call station to be written into the memory U$b$ in place of the directory number. The circulating memories U$a$, U$b$, U$s$ and U$p$ are of mutually identical construction. Also, the decoders D$a$ to D$p$ are of the same construction.

The memory U$s$ acts by way of decoder D$s$ to control the switches ESS1 to ESS$x$, which switches respectively connect the speech energy stores ES1 to ES$x$ to the multiplex line SM. As will be described hereinafter, these speech energy stores serve to connect stations to which different time positions have been assigned.

There are also auxiliary members U$da$, U$db$, UQ, U$dz$, US$i$, U$ds$ and U$dp$ which contain delay networks. These delay networks may be in the form of a nickel wire of appropriate length. One or more pulses pass through these delay networks and upon arriving at the end of a wire are returned to the start thereof (see FIG. 3). These pulses therefore circulate periodically and are used to effect particular control operations with a periodic repetition.

Figure 4:
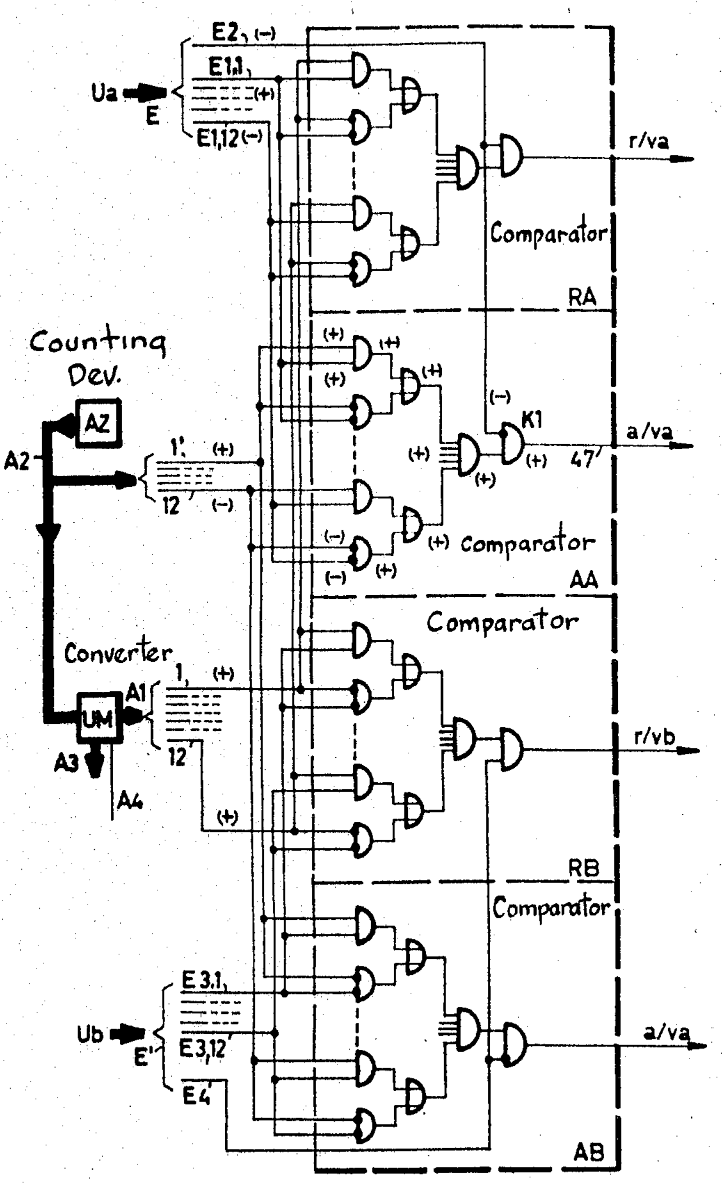
FIG. 4 is a circuit diagram of comparator arrangements which may be employed in both the foregoing embodiments of FIGS. 1 and 2.

Associated with the rotary memories are comparators which, in the event of particular addresses being present, for instance in the converter UM or the generator AZ and in memory U$b$, emits signals during particular time positions. Thus, for instance, if the address and memory U$a$ corresponds to the address produced by generator AZ, a signal is transmitted from the comparator AA during the appropriate time position to the central control system S$t$E. The same applies to the comparators RA, RB, AB, VZ, VS and VP. A suitable construction for comparators RA, AA, RB, AB is illustrated in FIG. 4. Variations in the state of switching during a connection are discovered at the time when the address generator AZ produces the address of the approriate station concerned in the call at its output A1. Depending upon the stage of switching, the information cycle in the system S$t$E is then followed by an operation cycle, and on the basis of the determinations made during the operation cycle, the central control system S$t$E transmits particular orders in the form of write-in pulses. These pulses enable, via switches, rotary memories that deliver signals during the particular time slots concerned to initiate certain switching functions. Gating and trigger circuits which control the transmission of write-in pulses are actuated in dependence upon the combination of signals supplied to the central control system.

FIGS. 1 and 2 differ from one another mainly in the different arrangement of the memories and, correspondingly, in the different way in which the gating and trigger circuits in the central control system are controlled.

As can be seen in FIG. 1$b$, the central control system S$t$E is broken down into the following sections:

(I) Section for signal reception
(II) Section for signal storage
(III) Section for position storage (delay networks)
(IV) Section for signal processing
(V) Section for order storage
(VI) Section for order implementation Gating circuits in the signal reception section (I) are controlled in dependence upon the combination of signals supplied to the system S$t$E, and actuate trigger circuits in the signal storage section (II). The signals relevant to a particular connection are received in section (I) during the time position ceased for that connection, together with the addresses associated with the particular switching event concerned, as produced by a generator, for instance generators AZ, ZS or ZP. At the same time as the signals are received, pulses are supplied to the delay networks of section (III). A pulse received in a delay network, for instance network AP$h$ appears at the output 100 μsec. later. Consequently, a pulse received in an information cycle during a particular time slot, for instence time slot P1, is delivered after about 100 μsec. in the operation cycle during the same time slot. As will become apparent from the embodiment to be described hereinafter, the time positions P0, P96 to P99 are employed to control the gating and trigger circuits of the central control system S$t$E. The information supplied thereto comes from the rotary memories or from the comparators. The orders given by the central control system are supplied to the rotary memories or to the switches associated therewith.

The trigger circuits of section (V) of the central control system which were operated in the previous information cycle are reset in the subsequent operation cycle during the time position P96. Time position P98 is employed to reset whichever of the signal storage section trigger circuits have been operated in the previous information cycle.

In the embodiments to be described hereinafter, speech energy stores are provided for break-in connections. To produce such connection, a common speech energy store is assigned to the breaking-in station and to the busy station which it is required to call. This common store is operated at its own particular cycle. In other words, a free speech energy store is seized by means of a speech energy store address generator ZS, and the addresses stored, during a first time position allotted to the breaking-in station and in a second time position allotted to the busy station, in the memory U$s$, by means of which the speech energy stores are connected to the speech multiplex line SM. In other words, the seized speech energy store is connected to the multiplex line SM during the first and second time positions, and so, as will be described hereinafter, the speech energy of the connection during the first time position is transmitted to the connection during a second time position and vice-versa.

(1a) Breaking-in, by means of a break-in key into an existing connection in a PBX system with speech energy stores, and without a register, or a separate break-in cycle, by means of a break-in key (FIG. 1)

If no static register R (as shown in FIG. 2$a$) is utilized to control break-in, the required information to be obtained and the appropriate operations performed, when the address of the station to which the operation is being performed is present at the output of the generator AZ. Switching operations connected with the speech energy store to be seized, or already seized, are controlled by the generator ZS.

It will be assumed that the subscriber of station N1 has initiated a connection to the station N2 and that the time position P1 has been assigned to this connection. It will be further assumed that the subcriber of station N2 is busy. The subscriber station N1 can now give a break-in signal, for instance by means of a break-in key. The break-in signal is evaluated in the digits receiver Z, and a signal is transmitted via conductor $qs$ to the central control system $sp$E. The break-in signal can only be received provided that a free digits receiver is available. When the address of the seized digits receiver is provided at the output of the generator ZZ, evaluation of the break-in signal is initiated. Gate G1 is opened during time slot P0 and operates via gates Z2 and Z3 to enable trigger circuit SQ during the information cycle, there then being a signal present on conductor JF. Circuit SQ stores the information corresponding to a desired break-in in the central control system StE.

Gate G4 is opened during time slot P1, since a no-signal has been provided to the first input via conductors db2 (a/vd) to indicate that the memory Udb is not storing a pulse during time slot P1 since the desired station N2 is busy, and since a yes-signal is provided via gate G5 from conductors b3 to the second input thereof to indicate that a complete address is stored in memory Ub during time slot P1, and since a yes-signal (a busy signal) is provided to the third input via conductor bs and since a yes-signal is provided to the fourth input via the conductor a/va as the generator AZ is providing at output A2 an address agreeing with the address stored in memory Ua during time slot P1, and since a no-signal is connected to the fifth input via conductor a/vb as the address at output A2 of the generator AZ does not agree with the address in the memory Ub. The opening of gate G4 acts by way of gate G5 to bring bistable trigger circuit X into the operative condition. A pulse is supplied during time slot P1 by way of conductor a/va to delay line APh and appears after 100 μsec. at the output thereof in the operation cycle. Yes-signals are now connected to the 1, 2 and 3 of gate G7 from bistable trigger circuit SQ, from bistable trigger circuit X, and by way of output 0 of the auxiliary counting device QZ, so that gate G8 brings trigger circuit Y1 into the operative condition during time slot P97. The signal provided to input 4 and the signal connected to input 5 during time slot P1 in the operation cycle, open gate G9. A pulse is stored during time slot P1, by way of gate G10 and conductor q1, in the break-in rotary memory UQ. Also, a pulse is supplied via gate G11 to the auxiliary counting device QZ so that it is stepped onto step 1. Since a pulse has now been stored during time slot P1 in the break-in memory UQ and the auxiliary counting device QZ has been moved to step 1, further switching operations can now be initiated.

(1b) Storage of the address of a free speech energy store carrying time slot P1 in rotary memory Us, and storage of a pulse in rotary memory Uds for controlling the switch for connecting the speech energy store to the speech multiplex line SM The information cycle for a speech energy store ES1 is initiated when the generator GS produces the address of the speech energy store, this is independently of whether the speech energy store is free or engaged. The free or engaged states are determined by a comparison in the information cycle with addresses circulating in the rotary memory Us, this in the presence of the address at the output of the generator ZS. If it is determined in the information cycle that the speech energy store address presented at the output of the generator ZS is not contained in the memory Us, then by way of the comparator VS, during the succeeding operation cycle, an indication is provided that the store is not busy. Thus, during time slot P1, a signal is transmitted by way of the conductor s, on the basis of the comparison to the effect that the address of speech energy store ES1 has not been stored in the rotary memory Us. Therefore, gate G12 is enabled during time slot P1 since a yes-signal is provided by way of conductors a3 to the first input when a complete address has been stored in memory Ua during time slot P1, and since a yes-signal appears at the second input when a signal is received by way of conductor b3 to indicate that a complete address has been stored during time slot P1 in memory Ub and since a yes-signal appears by way of conductor bs at the third input to indicate that the busy signal has been stored during time slot P1, and since a yes-signal appears at the fourth input to indicate that a pulse has been stored during time slot P1 in the break-in memory UQ, and since a no-signal appears by way of conductor s at the fifth input during time slot P1 to indicate that no address has been stored during time slot P1 in the memory Us.

The opening of gate G12 enables bistable trigger circuit X1 by way of gate G13 when an information cycle is operative and there is thus a signal on the line JF, and so a yes-signal appears at the first input of gate G14. Also, a signal appears at the second input of gate G14 from the auxiliary counting device QZ which is at the step (I). The bistable trigger circuit X1 indicates the break-in request so that a free speech energy store can be requested. Bistable trigger circuit Y2 is operated during time slot P97 by way of gate G15. By way of conductor a/va, in the information cycle, a pulse is supplied to delay line APh, and is supplied after 100 μsec. to the gate G16 during the operation cycle. Signals therefore appear at the two inputs of gate G16 and gate G16 opens. A pulse is derived from output 6 of gate G16 by way of gate G17 to conductor d4 so that switch D4 closes. The address of the seized speech energy store, for instance store ES1, is then stored in the rotary memory Us from the generator GS. Simultaneously, a pulse is supplied by way of conductor ds1 to the rotary memory Uds and stored therein, circulating in phase with time slot P1. The switch Sp3 therefore closes every 100 μsec. during time slot P1 so that by way of decoder Ds the switch ESS1 is operated every 100 μsec. during time slot P1 and connects the speech energy store ES1 to the speech multiplex line SM. A pulse is provided by way of output 6 of gate G16 and via gate 11 to the auxiliary counting device QZ so that it is stepped on by one step to the step 2 position. The other switching operation that is necessary for breaking-in can then be performed. When after the completion of the switching operation thus described, the generator AZ emits the address of the desired busy station N2, another break-in operation is initiated.

(1c) Storing the break-in signal during the time slot (P10) of an existing connection of the desired station N2 in the break-in memory UQ When generator AZ provides the address of the required busy station N2, G18 is brought into its operative state since a yes-signal is connected to the first input thereof by way of conductors a3 to indicate that a complete address has been stored in memory Ua during time slot P1; a signal is provided to the second input by way of conductor r/vd when the address at the output of converter UN agrees with the address during time slot P1 in memory Ua; a yes-signal is provided to the third input during time slot P1 by way of conductor s to show that the address of a free speech energy store has been stored in memory Us during time slot P1; since a yes-signal is provided by way of conductors bs to the fourth input to indicate that the desired station is busy; and a yes-signal is provided by way of conductors q2 to the fifth input to indicate a pulse has been stored during time slot P1 in memory UQ. Opening of gate G18 brings bistable trigger circuit X2 into its operative state during the information cycle by way of gate G19. Bistable trigger circuit X2 indicates a busy state of the required station N2. Gate G20 is operated during time slot P10 in the same information cycle, there being a yes-signal provided to the first input thereof by way of conductor da2 as a pulse for connecting through the station N2, assuming that it is the calling station of the existing connection, has been stored during time slot P10 in the rotary memory Uda; a no-signal connected to the second input by way of conductor q2 to indicate that no pulse has been stored during time slot P10 in the break-in memory UQ; a yes-signal is provided by way of conductor a/va to the third input thereof as the address at output A2 of generator AZ agrees with the address during time slot P10 in the memory Ua; a yes-signal is provided by way of conductor b3 to the fourth input thereof to show that a complete address has been stored in the memory Ub during time slot P10; a no-signal has been applied by way of conductor *s* to the fifth input to indicate that the memory U*s* is not storing an address at a speech energy store during time slot P10; a yes-signal is applied to the sixth input thereof by way of conductor *db*2 to indicate that a pulse for connecting through the called station and *x* of the existing connection has been stored in memory *udb* during time slot P10; and a no-signal has been provided via conductor *p* to the seventh input of the gate to indicate that no address has been stored in memory U*p*.

The opening of gate G20 causes bistable trigger circuit S3 to be conditioned to its operative state through gate G21. Circuit S3 indicates the existing connection of the required station N2. Yes-signals are now connected to inputs 7, 8, 9 of bistable trigger circuits X2 and X3, and of auxiliary counting device QZ, by way of output 2, so that bistable trigger circuit Y3 is made operative during time slot P97 through gates G22 and G23. Simultaneously as gate G20 opens, delay network GP*h* receives a pulse by way of gate G24. This pulse is effective to open gate G24′ during time slot P10 during the operation cycle. A pulse is stored during time slot P10 in the break-in memory UQ via output 10 of gate G24′ and via gate G10 and conductor *q*1. The pulse stored during time slot P1 in memory UQ is simultaneously cancelled. By way of output 10 of gate G24′ and of gate G11, the auxiliary counting device QZ receives a pulse which steps it onto its next step, step 3. Similar arrangements (not shown) are provided for cases when the wanted subscriber address is in memory U*b* instead of memory U*a*.

(1d) Storage of the address of the seized speech energy store ES1 in rotary memory U*s* during time slot P10

When generator GS provides the address of the seized speech energy store ES1 after the event hereinbefore described have been performed, the next operation for breaking-in is initiated. Gate G25 is opened in that it has a yes-signal on its first, second, third, fourth and fifth inputs. The yes-signal input provided by way of conductor *a*3 indicates that memory U*a* is storing a complete address during time slot P1. The second input indicates by way of gate G5 and conductors *b*3 that memory U*b* is storing a complete address during time slot P1. The signal on the third input is provided by way of conductor *bs* to indicate that the called station N2 is busy. The signal applied to the fourth input shows that memory UQ is storing a pulse during time slot P1. The Yes-signal is provided to the fifth input to indicate that the address present at the output of generator ZS agrees with the address during time slot P1 in the memory U*s*.

With gate G25 open, gate G26 is operative to enable bistable trigger circuit S4 during the information cycle. Bistable trigger circuit S4 indicates storage of the address of speech energy store ES1 in the memory U*s*.

Gate G27 is opened during time slot P10 in the same information since a yes-signal is connected by way of conductor *da*2 during time slot P10 to the first input thereof to indicate that rotary memory U*da* is storing a pulse during that time slot for connecting through the calling station into and of the existing connection during time slot P10; and since a yes-signal is connected by way of conductor *a*3 to the second input thereof indicating that memory U*a* is storing a complete address during time slot P10, and since a yes-signal has been provided by way of gate G5 and conductor *b*3 to the third input thereof to indicate that rotary memory U*b* is storing a complete address during time slot P10; and since a yes-signal is connected by way of conductor *q*2 to indicate at the fourth input that the break-in memory UQ is storing a pulse during time slot P10; and since a no-signal is received over conductor *s* by the fifth input of the gate to indicate that memory U*s* is not storing any address during time slot P10; and since a yes-signal is applied to the sixth input over conductor *db*2 to show that memory *udb* is storing a pulse during time slot P10 for connecting through call station N*x* of the existing connection.

The opening of gate G7 enables, through gate 28, bistable trigger circuit X5 in the information cycle. Trigger circuit X5 indicates the existing connection. In that yes-signals have been connected to output 11 of trigger circuit X4, to output 12 of trigger circuit X5 and to output 3 of auxiliary counting device QZ, gate 29 opens and by way of gate G30, bistable trigger circuit Y4 is made operable during time slot P97.

Simultaneously with the opening of gate G27, delay line ZP*h* stores a pulse during time slot P10; such pulse, with the signal during the time slot at input 13, opens gate G31 after 100 μsec. in the operation cycle. Switch D4 is closed through the agency of gate G17 and conductor *d*4. The address of the seized speech energy stores ES1, present at the output of generator GS, is stored in rotary memory U*s* during time slot P10. A pulse is applied by way of gate G31 and conductors *dq*1 during time slot P10 to the break-in memory UQ and cancels the pulse stored therein during time slot P10. Also, a pulse is supplied by way of gate G11 to the auxiliary counting device QZ so that said device is stepped onto step 4.

During time slot P1 a pulse is applied to delay network AP*h* over conductor *a*/*va*, and appears at the output thereof after 100 μsec. i.e. in the operation cycle. Gate G32 therefore opens. A pulse is also applied by way of conductor *dq*1 during time slot P1 to memory UQ to cancel the pulse circulating therein during this time slot. Memory U*s* then stores the address of speech energy store ES1 during time slot P1 and during time slot P10, in readiness for the connection of speech energy store ES1 over switch ESS1 to the speech multiplex line SM.

(1e) Cancellation of the address store during time slot P1 in memory U*b* of the required busy station N2, and of the busy signal When generator AZ produces the address of the breaking-in station N1 to output A2, gate G33 opens during time slot P1, since a yes-signal is applied to the first input of gate G33 over the conductor *auf* as the breaking-in station N1 has been indicated in memory UM as entitled to break-in; and since a yes-signal has been connected over conductor *a*/*va* to the second input of gate G33 to indicate that the address at the output of generator AZ agrees with the address stored in memory U*a*; and since a yes-signal is applied to the third input of gate G33 by way of gate G5 and conductors *b*3 to indicate that memory U*b* is now storing a complete address during time slot P1; and since a yes-signal is applied to the fourth input over conductors *s* to indicate that memory U*s* is storing the complete address of the speech energy store ES1 during time slot P1; and since a no-signal is applied by way of conductor *q*2 to the fifth input of the gate to indicate that memory UQ has seized to store a pulse during time slot P1; and since a no-signal is applied over conductor *db*2 to the sixth input of gate G33 to indicate that memory U*db* is not storing a pulse for connecting through the busy station N2 to the speech multiplex line SM during time slot P1; and since a yes-signal is applied to the seventh input of the gate over conductor *bs* to indicate that the desired station N2 has been found to be busy.

The opening of gate G33 causes bistable trigger circuit X6 to be enabled by way of gate G34 during the information cycle. Circuit X6 indicates the busy state of the station N2 during time slot P1. By way of output 14 of trigger circuit X6 and of the signal connected to output 4 of the auxiliary counting device QZ, gate G35 is opened so that bistable trigger circuit Y5 is operated through gate G36 during time slot P97. Since a pulse is supplied during time slot P1 over conductor *a*/*va* to the delay network AP*h*, gate G37 is brought into its operative state during time slot P1 over the output 15 of bistable trigger circuit Y5. The pulse is transmitted to the rotary memory U*si* over conductors *bs'* so that the address during time slot P1 is negated in memory U*si*. Also, a pulse at time slot P1 is provided over conductor 1*b* to memory U*b* to cancel the address stored therein during the time slot, the address of the required busy station N2. A pulse is transmitted to the auxiliary counting device QZ by way of gate G11 so that the counting device QZ is stepped onto step 5.

(1f) Storage of a pulse in rotary memory U*ds* for controlling switch ESS1 by way of decoder D*s*

Once the generator ZS for speech energy store addresses provides the address of the seized speech energy store ES1, gate G38 opens during time slot P1 assigned to the breaking-in station. This occurs in that a yes-signal is applied to the first, second sixth and seventh inputs of gate G38 and no-signals are applied to the third, fourth and fifth inputs of the gate. The signal applied to the first input of gate G38 over conductor *vs* when the address of speech energy store ES1 is provided during time slot P1 to the output of generator ZS, and to the rotary memory U*s*. The signal applied to the second input of gate G38 indicates that a complete address has been stored in memory U*a* during the time slot. The input signal to the third input of the gate indicates that memory U*d* is not storing an address during time slot P1. The signal applied to the fourth input over conductor *ds* indicates that no busy signal is applied during time slot P1. The signal applied to the fifth input indicates that no pulse is being stored during the time slot in the break-in memory UQ. The signal applied to the sixth input over conductors *ds*2 indicates that a pulse for controlling connection of the speech energy store ES1 has been stored during time slot P1 in memory U*ds*. The affirmative signal at the seventh input of the gate indicates that the address provided during time slot P1 at output A2 of the generator AZ agrees with the address in memory U*a* during time slot P1.

The opening of gate G38 causes, through gate G39, the operation of bistable trigger circuit X7 in the information cycle. Bistable trigger circuit X7 indicates storage of the address of speech energy store ES1 during time slot P1 in memory U*s*. The gate G40 is opened during time slot P10 in the same information cycle, since a yes-signal is supplied to the first input thereof over conductors *vs* to indicate that the address of the busy speech energy store ES1 has been provided at the output of generators ZS and at the cutput of memory U*s*. In addition, a yes-signal is supplied to the second input by way of gate G5 and conductor *b*3 to indicate that a complete address has been stored during time slot P10 in memory U*b*. Also, a yes-signal on conductor *a*3 to the third input indicates a complete address has been stored in memory U*a*. A no-signal supplied to the fourth input of gate G40 over conductor *q*2 indicates that the memory UO is free of an address during time slot P10. A no-signal on conductors *bs*2 to the fifth input of gate G40 shows that memory U*ds* is not storing a pulse during time slot P10 for controlling the switching of circuit S*e*3. A yes-signal is provided during time slot P10 via conductor *va*2 to the sixth input of gate G40 to show that a pulse has been stored during that time slot in memory U*ba* for controlling the operation of switch S*p*1 and a yes-signal is provided over conductors *db*2 to the seventh input of the gate to indicate that memory U*db* is storing, during time slot P10, a pulse for controlling the operation of switch S*pq*.

Opening of gate G40 and the subsequent operation of gate G41 causes the bistable trigger circuit S8 to be operated during the information cycle placing yes-signals on inputs 15 and 16 of gate G42 and by way of output 5 of the auxiliary counting device QZ, to input 17 of gate G42. Bistable trigger circuit Y6 is operated during time slot P97 through gate G43. Simultaneously with the opening of gate G40, a pulse is supplied during time slot P10, through gate G24, to delay network ZP*h* so that gate G44 is opened in the operation cycle during time slot P10 by way of inputs 18 and 19. Consequently, a pulse is supplied to and stored in memory U*ds* by way of conductors *ds*1 during time slot P10. Switch S*p*3 therefore closes every 100 µsec. during time slot P10 and, by way of decoder *ds* switch ESS1 is also operated during time slot P10 from memory U*s*.

Figure 5:
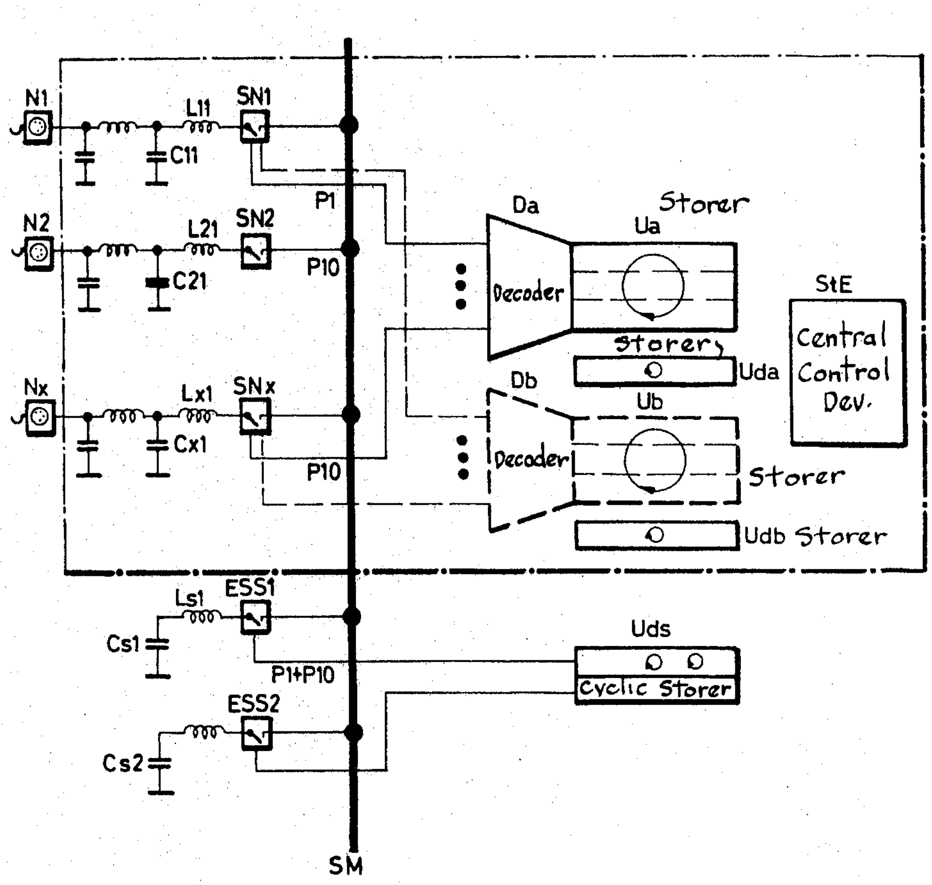
FIG. 5 is a schematic circuit diagram of the speech energy stores and indicating the mode of operation of the two embodiments disclosed herein.

Since a time slot P1 pulse and a time slot P10 pulse are now stored in memory U*ds* and memory U*s*, switch S*p*3 is closed during these two time positions. Consequently, a pulse is transmitted during each of these time positions from the memory U*s*, through decorder D*s* to the switch ESS1, and speech energy store ES1 is connected by way of switch ESS1 to the speech multiplex line SM during time slots P1 and P10. The breaking-in station N1 is connected to the signal multiplex line SM during time slot P1, since the address thereof is stored in memory U*a* during time slot P1, and since a pulse is stored during time slot P1 in memory U*da*. The stations concerned in the original connection, i.e. station N2 and station N*x* called thereby, are connected to the speech multiplex line SM by means of the respective rotary memories U*a*, U*b* and U*ds*, U*db*, during time slot P10. FIG. 5 illustrates, therefore, that stations N1, N2 and N*x* are each connected at different times by way of inductances L11, L12, L*x*1 and capacitances C11, C12, C*x*1 to the speech multiplex line SM in each 100 µsec. during time slots P1 or P10. Capacitance C*s*1 of speech energy store ES1 is connected during time slot P1 and during time slot P10 to the multiplex line SM on each 100 µsec. Consequently, by means of conductances L*s*1, L11, L21 and L*x*1, there is in a known manner an exchange of charges between whichever capacitance are simultaneously connected to the speech multiplex line. A more detailed description of the exchange of energy just described may be had by reference to British Pat. No. 822,297. The foregoing provides that there is an exchange of speech energy between the station N1, N2 and N*x*. The required break-in connection between stations N1 and N2 is therefore provided. In every operation cycle and thus when there is a signal on conductor O*p*, gate G45 is opened during time slot P98, and a signal is supplied to gate G46. If bistable trigger circuit Y6 is also in the operative state, gate G46 opens. A signal is thus supplied by way of the output gate G46 to the auxiliary counting device QZ to reset that device to 0. Further break-in operation can then be initiated by way of the central control system S*t*B.

Figure 2A:
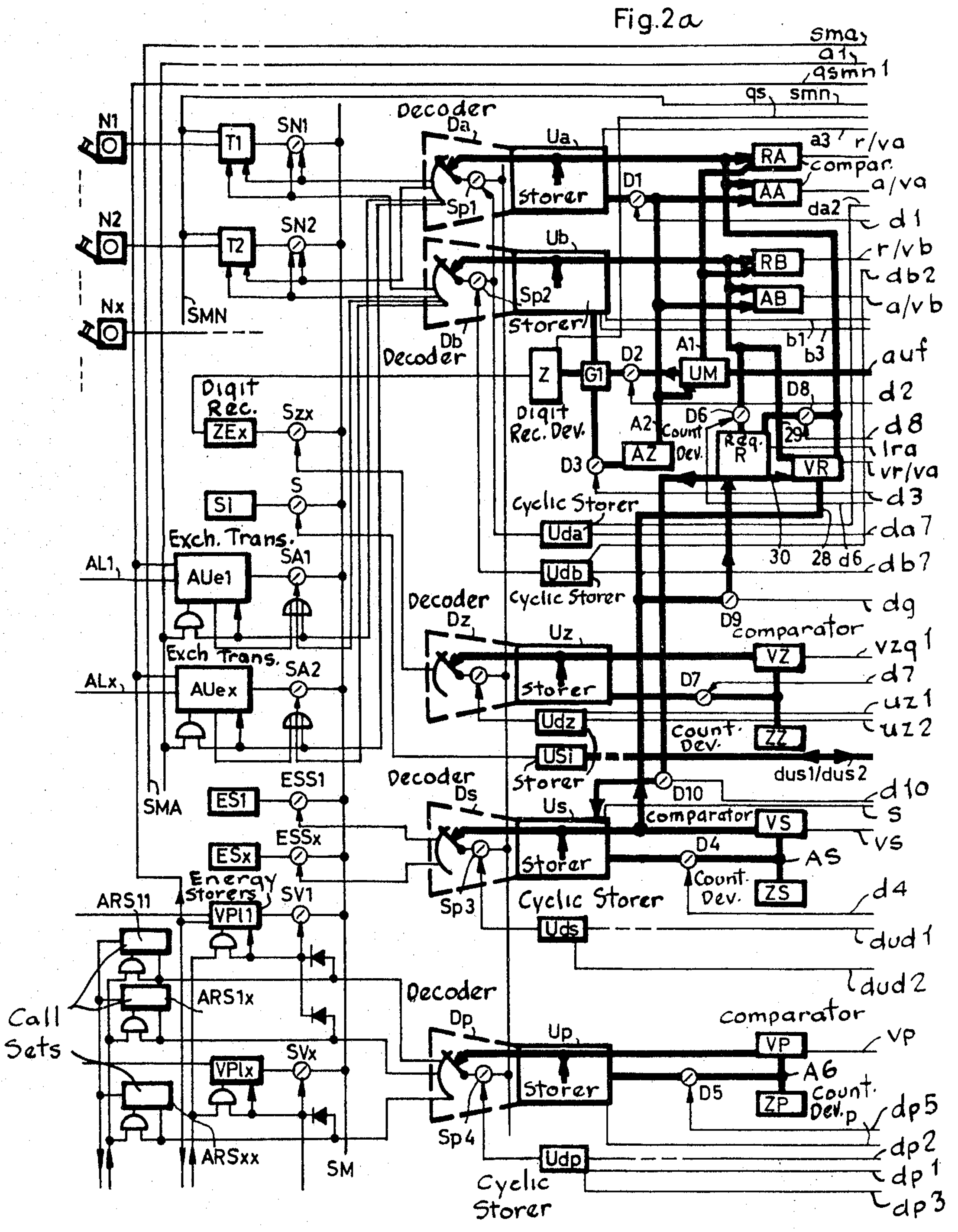
FIGS. 2*a* and 2*b* together form a schematic circuit diagram of a second embodiment of the invention.
Figure 2B:
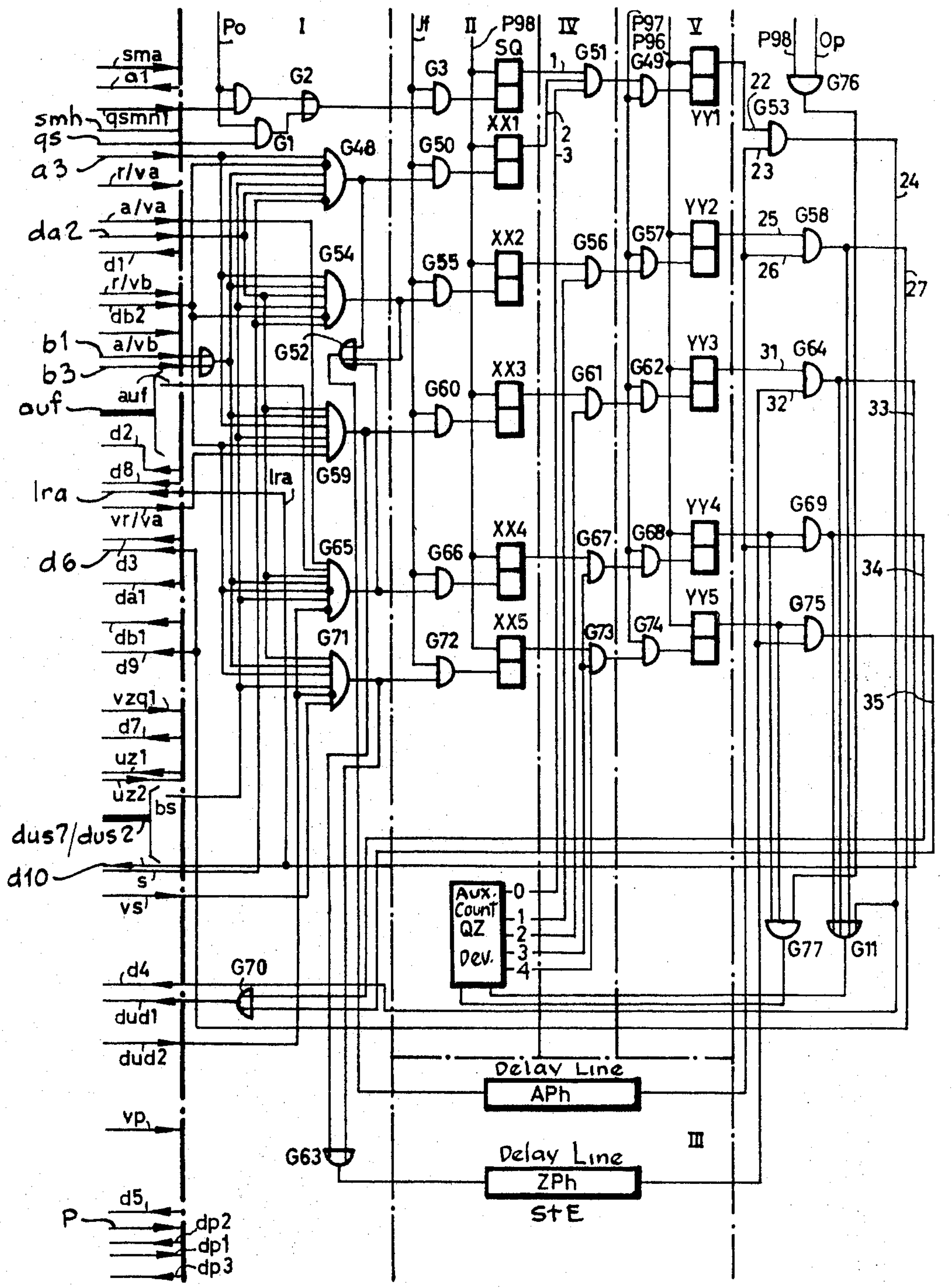

(2) Connection of a station, through the operation of the break-in key, into an existing connection in a PBX having speech energy stores and a register, without a special break-in memory (UQ of FIG. 1), (FIGS. 2A and 2B).

The switching operation required for breaking-in are performed under the control of the auxiliary counting device QZ. By means of a register R, the signal stored during time slot can be compared with the signals of a different time slot. For example, the signals during one operation may be compared with signals of a different time slot in the operation of the required breaking-in of an established connection.

(2a) Seizing of a free speech energy store and storage of the address thereof in memory U*s* during time slot P1 seized for the breaking-in connection.

For purpose of illustration, it will be assumed that station N1 is attempting to establish a connection to station N2, and that time slot P1 has been assigned for that purpose. It will be further assumed that station N2 is busy. To initiate break-in of station N1 into the existing connection concerning N2, the break-in key at station N1 is operated. A break-in signal is transmitted over connectors *qs* to the central control system S*t*E as described in Section a above, when the generator ZZ seized for breaking-in at its output, for example, digits receiver Z*ex*. The break-in signal is evaluated in the central control system as described above. To facilitate comparison of these operations with Section 1a, the gating and trigger circuits of importance for such operations have been given the same references in FIGS. 2*a* and 2*b* as were given for FIGS. 1*a* and 1*b*. Bistable trigger circuit SQ is brought into operative condition during time slot P0 and indicates that there is a desire to break-in. Since the auxiliary counting device QZ is conditioned to 0 (reset), further information is received and evaluated in the central control system during the same information cycle.

Gate G48 opens during time slot P1 since yes-signals are provided to the first, third, fourth and fifth inputs thereof and no-signals are provided on the second and sixth inputs thereof. The yes-signal applied to the first input over conductor *a*3 indicates that a complete address has been stored in memory U*a* during time slot P1 (the address of the calling station N1). The no-signal provided at the second input of gate G48 over conductor *db*2 indicates the absence of any pulse stored during time slot P1 in memory U*db* and that called station N2 is not engaged during time slot P1. The signal applied over conductor *b*3 and at gate 49 to the third input shows that a complete address has been stored in memory U*b* during time slot P1. During time slot P1 a busy signal is supplied over conductor *bs* to the fourth input of the gate. The yes-signal is provided over conductors *da*2 to the fifth input of the gate to indicate that a pulse has been stored in memory U*da* during time slot P1. Also, a no-signal is supplied over conductor *s* to the sixth input of the gate in the event a complete address is not stored during time slot P1 in the memory U*s*.

The opening of gate G48, through gate G50, enables the bistable trigger circuit XX1 during the information cycle. Gate G51 opens since bistable trigger circuit SQ supplies a yes-signal to its input 1, bistable trigger circuit XX1 supplies a yes-signal to input 2, and the auxiliary counting device QZ supplies at its 0 output a yes-signal to input 3. As a result, bistable trigger circuit YY1 is operated by way of gate G49. At the same time as gate G48 opens, delay network AP*h* receives a pulse during time slot P1 by way of gate G52 and also input 23 of gate G53 receives a pulse by way of the output of delay network AP*h* in the operation cycle. Gate G53 is therefore opened during time slot P1 by way of its inputs 22 and 23. A pulse passes from output 24 of gate G54 over conductor *d*4 to switch D4. Closure thereof causes the address of the free speech energy store ES1 present at the output of generator ZS to be stored in the memory U*s*. Simultaneously, a pulse is transmitted by way of gate G11 to the auxiliary counting device QZ to step it to step 1.

(2b) Storage of the address of the seized speech energy store and of the address of the called busy station N2 in register R The switching operations necessary to store the address of speech energy store ES1 and of the called busy station N2 in register R are initiated after the auxiliary counting device has advanced to step 1.

Gate G54 becomes operative since a yes-signal is supplied to its first input over conductor *a*3 to denote storage of a complete address during time slot P1 in memory U*a*; and a yes-signal is supplied over conductor *b*3 and gate G49 to the second input of gate G54 to indicate that memory U*b* is storing a complete address during time slot P1; a yes-signal is provided during time slot P1 over conductors *da*2 to the third input thereof to denote that memory U*da* is storing a pulse for connecting the calling station N1 to the speech multiplex line SM; a busy signal is applied to conductor *bs* during time slot P1 and accordingly to the fourth input of the gate; a no-signal is supplied over conductors *db*2 to the fifth input to show that memory U*db* is not storing a pulse for connecting the called busy station N2 to the speech multiplex line SM during time slot P1; and since a yes-signal has been provided over conductor *s* to the sixth input of the gate to show that memory U*s* is storing during time slot P1 the complete address of the speech energy store ES1.

The opening of gate G54, by way of gate G55, causes bistable trigger circuit XX2 to be operated during the information cycle. Since auxiliary counting device QZ has advanced to step 1, bistable trigger circuit YY2 is operated during time slot P97 by way of gates G56 and G57. Simultaneously with the opening of gate G54, delay network AP*h* receives, by way of gate G52, a pulse during time slot P1 so that gate G58 is opened by way of its inputs 25 and 26 during time slot P1. Consequently, switch D9 receives a pulse by way of output 27 and conductor *d*9. Switch D9 closes, and the address of speech energy store ES1 is transferred during time slot P1 to the register R. Simultaneously, switch D6 receives a pulse over conductor *d*6 so that the directory number of the called busy station N2, is also received in register R during time slot P1 where it is translated into the corresponding equipment number. Also, a signal is applied by way of output 27 of gate G58 and by way of gate G11 to step the auxiliary counting device QZ to step 2.

(2c) Storage of the address of the speech energy store ES1 during time slot P10 assigned to the existing connection of the called busy station N2

The advance of the counter QZ to step 2 initiates another switching operation. Gate G59 opens during time slot P10 since a yes-signal is applied over conductor *de*2 to its first input, to indicate that memory U*da* is storing a pulse during time slot P10 for connecting the station N2 to the multiplex line SM, the station N2 being the calling party of the existing connection. A yes-signal is provided to gate G59 over conductors *b*3 and gate G49 to the second input thereof when memory U*b* is storing a complete address during time slot P10. A yes-signal is applied during time slot P10 over conductor *a*3 to the third input of gate G59 to show that memory U*a* is storing a complete address. A yes-signal is applied over conductors *bs* to the fourth input of gate G59 during time slot P10 to mark the busy state of the existing connection. A yes-signal is applied over conductor *db*2 to the fifth input of gate G59 to indicate that memory U*db* is storing during time slot P10 a pulse for connecting the called station of the existing connection to the speech multiplex line SM. A yes-signal on conductor *vr*/*va* to the sixth input of gate G59 to show that register R is storing the address of the station N2 (the calling station of the existing connection). The result of the comparison is determined in the light of the signals applied to inputs 29 and 30 (FIG. 2*a*).

The opening of gate G59, and gate G60, causes the operation of bistable trigger circuit XX3 during the information cycle. Since the auxiliary counting device QZ has advanced to step 2, gate G61 and gate G62 operated bistable trigger circuit Y3 during time slot P97. Simultaneously with the opening of gate G59, delay network ZP*h* receives a pulse from gate G63 during time slot P10. This pulse is supplied at the output of delay network ZP*h* in the operation cycle, i.e. after about 100 $\mu$sec. Consequently, gate G64 is opened by way of its inputs 31 and 32 during time slot P10.

Switch D10 receives a pulse by way of output 33 of gate G64 and by way of conductors *d*10. Closure of switch D10 results in memory *Us* receiving, during time slot P10, the address of the speech energy store ES1 as stored in register R. Simultaneously therewith, a pulse is transmitted over conductor *lra* to register R to cancel the address of station N2 therein concerned as calling station in the existing connection. Also, the auxiliary counting device QZ receives a signal by way of output 33 of gate G64 and gate G11 for advancing that device one more step to step 3.

(2d) Testing the authorization for breaking-in station N1 to break-in, and storing a pulse in memory U*ds* to control connection of speech energy store ES1 to speech multiplex line SM during time slots P1 and P10.

The advance of the counter (QZ) to step 3 initiates another switching operation for breaking-in. This new switching operation is indicated only when the generator AZ provides the address of the breaking-station N1. The reason for this is because the authorization of station N1 to such a breaking-in of an existing connection.

When generator AZ provides the address of the breaking-in station N1, gate G65 opens, since a yes-signal is applied during time slot P1 over conductor *a/va* to the first input thereof to indicate that the address present at output A2 of generator AZ agrees with the address in memory U*a* during time slot P1. Also, a yes-signal supplied over conductor *auf* indicates that converter UM is storing the authorization to break-in in respect to the station address present at the output of generator AZ, and since a yes-signal has been provided during ime slot P1 over conductor *da*2 to the third input of gate G65 when memory U*da* is storing a pulse during time slot P1 for connecting station N1 to the speech multiplex line SM. Also, a yes-signal is applied during time slot P1 by way of gate G49 and conductors *b*3 to the fourth input of gate G65 to indicate that memory U*b* is storing a complete address during that time slot. In addition, a no-signal is applied by way of conductors *db*2 to the fifth input of the gate to show that memory U*db* is not storing a pulse for connecting the busy station N2 to the multiplex line SM during time slot P1 and a busy signal is applied during time slot P1 over conductor *bs* to the sixth input. Further, a no-signal applied during time slot P1 by way of conductors *dud*2 to the seventh input of the gate indicates that memory U*ds* is not storing any pulse during time slot P1 for connecting the speech energy store ES1 to the speech multiplex line SM.

Gate G65 opens and causes, by way of gate G66, the operation of bistable trigger circuit XX4 during the information cycle. Since the auxiliary counting device QZ has advanced to step 3, gate G67 and gate G68 bring bistable trigger circuit YY4 into its operative state during time slot P97. Simultaneously therewith, as gate G65 opens, delay network AP*h* receives a pulse by way of gate G52 which opens gate G69 after 100 μsec. i.e. in the operation cycle.

Memory U*ds* receives a pulse during time slot P1 by way of output 34 of gate G69 and by way of gate G70 and conductor D*ud*1. This pulse closes switch S*p* every 100 μsec. Consequently, the speech energy store ES1 is connected to the speech multiplex line SM every 100 μsec. during the time slot P1 by way of decoder D*s* and switch ESS1. The auxiliary counting device QZ is advanced to step 4 by way of gate G11.

(2e) Storage of pulse during time slot P10 in memory U*ds* to control the connection of speech energy store ES1 to speech multiplex line SM during time slot P10

Provided that the address of the speech energy store ES1 has been generated and provided to the output of generator ZS, the advance of device QZ to step 4 initiates further switching operations. Gate G71 opens the time slot P10 since a yes-signal is applied to its first, second, third, fourth and sixth inputs and a no-signal is applied to its fifth input. The signal on conductor *da*2 during time slot P10 indicates to the first input of gate G71 that memory U*da* is storing a pulse during time slot P10 for the existing connection. The signal applied to the second input of gate G71 by way of conductors *b*3 indicates that memory U*b* is storing a complete address during time slot P10. The signal applied over conductor U*b*2 during time slot P10 to the third input indicates that memory U*db* is storing a pulse in that time slot for connecting the called station of the existing connection through. The signal applied to the fourth input over conductors *bs* indicates the busy state of the existing connection during time slot P10. The no-signal on conductor *dud*2 and at the fifth input of gate G71 indicates that memory U*ds* is not storing a pulse during time slot P10. The signal applied to the sixth input of the gate by way of conductors *vs* shows that the address of the speech energy store ES1 is present at the output of generator ZS and at the output of memory U*s* during time slot P10.

Upon the occurrence of the information cycle, the opening in gate G71 and of gate G72 causes bistable trigger circuit XX5 to be placed in the operative state. Since the counting device QZ has been advanced to step 4, gate G73 and gate G74 enable bistable trigger circuit YY5 into the operative condition during time slot P97. Simultaneously, as gate G71 opens, delay network ZP*h* receives a pulse by way of gate G63 which opens gate G75 during time slot P10 after a 100 μsec. delay, i.e. in the operation cycle.

Memory U*ds* receives a pulse by way of output 35 of gate G75, gate G70 and conductor *dud*1. This pulse is stored in memory U*ds* during time slot P10 and controls the operation of switch S*p*3. Consequently, speech energy store ES1 is connected by way of decoder D*s* and switch ESS1 during time slot P10 to the speech multiplex line SM.

In every operation cycle, gate G76 opens during time slot P98 and a yes-signal is supplied to gate G77. When the bistable trigger circuits YY4 and YY5 are in the operative states simultaneously, gate G77 opens and the signal is supplied to the auxiliary counting device QZ which is thereby reset to zero, and further break-in operation can be initiated by way of the central control system S*t*E.

Since memory U*s* stores the address of energy store ES1 during time slot P1 and during time slot P10, and since pulses circulate in memory U*ds* during time slot P1 and time slot P10, speech energy store ES1 is connected, by way of switch ESS1, to the speech multiplex line SM during both the time slots P1 and P10. This can be seen particularly from FIG. 5 and Section (1f) above. Capacitance (FIG. 5) of speech energy store ES1 is therefore connected during time slot P1 and during time slot P10 to the speech multiplex line SM each 100 μsec. Consequently, through inductances LS1, L11, L21 and L*x*1, there is in a known manner as above described, an exchange of charges or energy transfer between whichever capacitances C11, C*x*1, and C*s*1 are connected simultaneously to the speech multiplex line, with the result that there is an exchange of speech energy. Accordingly, the required break-in connection is provided between stations N1 and N2.

(3) Termination of the break-in by the breaking-station going on hook

Checking the right of a breaking-in station to break-in is effected, as described in Section (2d) hereof, when the address of that station, for instance the station N1, is provided at output A2 of generator AZ. However, if this action is to depend upon the authorization of one or both of the stations N2 and/or N*x*, concerned in the existing connection, then the central control system S*t*E must have one or two more stages for receiving and evaluating the authorization signal generated by the converter UM in respect of the particular station engaged in the existing connection when indicated by the generator AZ. The remaining control orders for establishing the break-in connection can then be made dependent upon the particular authorization of the stations concerned.

According to the foregoing description, therefore, in the event of a called station being busy, break-in is initiated by a special step, such as the operation of a key, and is completed in dependence upon the break-in authorization of the calling station, or possibly, of one or both of the stations concerned in the existing connection.

What we claim is:

1. In a time-division multiplex telecommunication system of the type wherein calling stations, called stations and speech energy stores are interconnected by way of a common speech multiplex line during time positions assigned thereto by a central control system, and in which stations have their busy conditions tested and calling stations have their classes of service determined, the improvement comprising apparatus for controlling the connection of a calling station to a busy called station, said apparatus including a first memory for storing the addresses of said speech energy stores, means for inserting the address of an idle speech energy store into said memory during the time position assigned to said calling station, means for generating the addresses of said speech energy stores, means operable in response to said address generator for inserting the address of said idle speech energy store in said first memory during the time position assigned to the busy called station to seize said store, thereby connecting said calling station to said busy called station via said speech multiplex line and said idle speech energy store during the time positions assigned to the respective stations.

2. A system according to claim 1, wherein said apparatus includes a break-in memory, means in said calling station for transmitting a break-in desire signal, and means responsive to said break-in desire signal for storing a pulse indicating the desired break-in in said break-in memory during the time position assigned to said calling station.

3. A system according to claim 2 comprising means effective to store said break-in desire signal in said break-in memory during the time position assigned to said called station.

4. A system according to claim 3, wherein said apparatus further includes storage means interposed between said address generator and said first memory for storing the addresses of said speech energy stores, and said break-in memory cyclicly provides said break-in desire signal stored therein and is effective to operate said storage means for transferring the address of the seized speech energy store from said address generator to said memory for speech energy store addresses during the time position of said called station.

5. A system according to claim 3, wherein said apparatus comprises storage means interposed between said address generator and said first memory for storing addresses of said speech energy stores, said storage means being operated in response to the storing of said break-in desire signal in said break-in memory to transfer the address of the seized speech energy store from said address generator to said first memory for speech energy store addresses during the time position assigned to an existing original connection.

6. A system according to claim 1 including a register and means effective to transfer the address of the seized speech energy store from the memory for speech energy store addresses to said register and means to store the address of said called station in said register upon determination of a busy condition of said called station.

7. A system according to claim 6, comprising switching means interposed between said address generator and said memory for speech energy store addresses, said switching means being effective to transfer the address of the seized speech energy store from said address generator to said memory during the time position assigned to said called station.

8. A system according to claim 7, comprising means for determining whether or not said calling station has the authority to break into an existing connection, the last mentioned means controlling the connection of the seized speech energy store to the speech multiplex line during the time positions of said calling and called stations.

References Cited

UNITED STATES PATENTS 3,274,342 9/1966 Brightman -------- 179—18.01

KATHLEEN H. CLAFFY, Primary Examiner

W. BROWN, Assistant Examiner

U.S. Cl. X.R.

179—15